United States Patent
Zakowski

(10) Patent No.: US 9,498,085 B2
(45) Date of Patent: Nov. 22, 2016

(54) FOOD PROCESSOR FEED TUBE ASSEMBLY

(71) Applicant: Joseph W. Zakowski, New Canaan, CT (US)

(72) Inventor: Joseph W. Zakowski, New Canaan, CT (US)

(73) Assignee: CONAIR CORPORATION, Stamford, CT (US)

( * ) Notice: Subject to any disclaimer, the term of this patent is extended or adjusted under 35 U.S.C. 154(b) by 94 days.

(21) Appl. No.: 14/247,363

(22) Filed: Apr. 8, 2014

(65) Prior Publication Data

US 2014/0299698 A1    Oct. 9, 2014

Related U.S. Application Data

(60) Provisional application No. 61/809,576, filed on Apr. 8, 2013.

(51) Int. Cl.
*A47J 43/07* (2006.01)
*A47J 44/00* (2006.01)

(52) U.S. Cl.
CPC ............. *A47J 43/0716* (2013.01); *A47J 44/00* (2013.01)

(58) Field of Classification Search
CPC ............ A47J 42/06; A47J 42/36; A47J 43/04; A47J 43/085; B02C 19/06; B02C 19/0043; B02C 19/005; B02C 19/065; B02C 23/18; B02C 19/066; B02C 19/068; B02C 23/08

USPC ............ 241/236, 224, 92; 99/337, 510, 551, 99/512

See application file for complete search history.

(56) References Cited

U.S. PATENT DOCUMENTS

| | | | |
|---|---|---|---|
| 4,226,374 A * | 10/1980 | Kafka | 241/37.5 |
| 4,614,306 A * | 9/1986 | Doggett | A47J 43/046 16/257 |
| 4,674,690 A * | 6/1987 | Ponikwia | A47J 43/046 241/282.1 |
| 8,146,490 B2 * | 4/2012 | Obersteiner et al. | 99/510 |
| 2008/0164350 A1 * | 7/2008 | Wu Chang | A47J 44/00 241/37.5 |
| 2008/0210796 A1 * | 9/2008 | Cozzolino | A47J 43/0761 241/282.1 |
| 2014/0021278 A1 * | 1/2014 | Armstrong | A47J 43/0794 241/37.5 |
| 2014/0246529 A1 * | 9/2014 | Kobos | A47J 43/07 241/100 |

* cited by examiner

*Primary Examiner* — Jimmy T Nguyen
*Assistant Examiner* — Peter Iannuzzi
(74) *Attorney, Agent, or Firm* — Grogan, Tuccillo & Vanderleeden, LLP

(57) ABSTRACT

A food processor feed tube assembly includes a first feed tube extension and a second feed tube extension telescopically and slidably received in the first feed tube extension. The second feed tube extension is configured to be movable from a retracted position in which the second feed tube extension is substantially entirely nested within the first feed tube extension, and an extended position in which the second feed tube extension is extended from the first feed tube extension.

6 Claims, 6 Drawing Sheets

FOOD PROCESSOR FEED TUBE ASSEMBLY

CROSS-REFERENCE TO RELATED APPLICATIONS

This application claims the benefit of U.S. Provisional Application Ser. No. 61/809,576, filed on Apr. 8, 2013, which is herein incorporated by reference in its entirety.

FIELD OF THE INVENTION

The present invention relates to food processors and, more particularly, to a feed tube assembly for a food processor.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is room for improvement in terms of ease of use and functionality. In particular, a limitation of existing food processing devices is that they are confined to dedicated configurations of feed tube size and shape, requiring larger food items to be manually cut into smaller pieces prior to being inserted into the feed tube.

SUMMARY OF THE INVENTION

It is an object of the present invention to provide a food processor having an extendable feed tube.

It is another object of the present invention to provide a feed tube assembly for a food processor that is capable of handling large food items.

These and other objects are achieved by the present invention.

According to an embodiment of the present invention, a food processor feed tube assembly is provided. The food processor feed tube assembly includes a first feed tube extension and a second feed tube extension telescopically and slidably received in the first feed tube extension. The second feed tube extension is configured to be movable from a retracted position in which the second feed tube extension is substantially entirely nested within the first feed tube extension, and an extended position in which the second feed tube extension is extended from the first feed tube extension.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
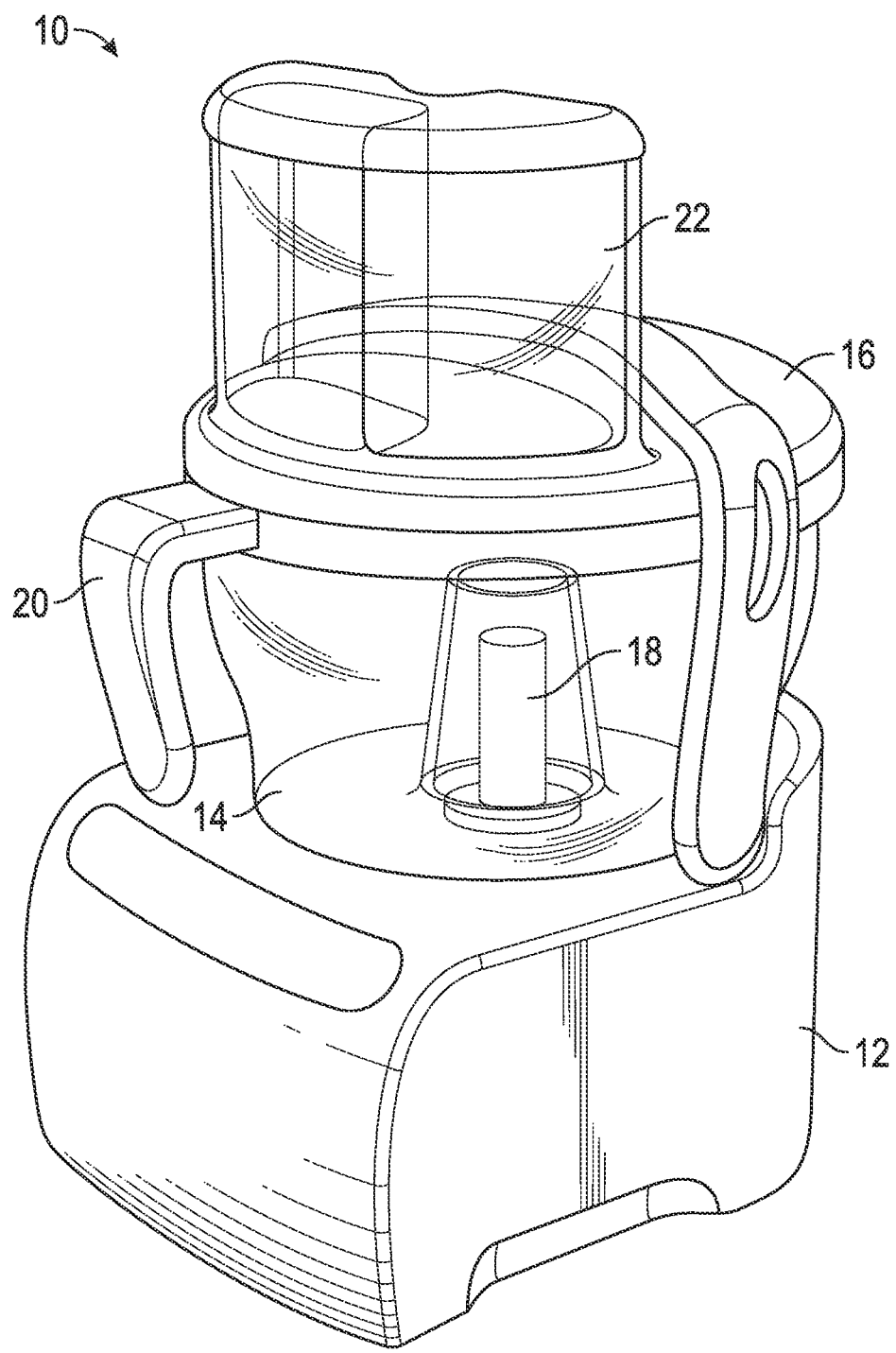
FIG. 1 is a perspective view of a food processor according to an embodiment of the present invention.

Referring to FIG. 1, a food processor 10 according to the present invention is shown. The food processor 10 includes a base 12, a work bowl or receptacle 14 received on the base 12, and a lid 16 configured to be selectively removable from the work bowl 14. Base 12 includes a motor or other rotary drive mechanism (not shown) connected to a rotatable output shaft 18 for rotatably driving a blade interior to the work bowl 14 and may include controls (not shown) for varying settings of the motor.

As further shown therein, work bowl 14 is generally cylindrical or frusto-conical in shape and has a handle 20 and a pour spout (not shown). The lid 16 defines a substantially circular body sized and is dimensioned to cover work bowl 14. The lid 16 also includes a feed tube opening (not shown). The feed tube opening may be generally oval in shape, although other shapes and dimensions are envisioned without departing from the broader aspects of the present invention.

As best shown in FIG. 1, the lid 16 may also include a feed tube 22 defining a substantially annular body having a substantially oval cross-section extending upwards from the lid 16 and in communication with the feed tube opening. As is well known in the art, the feed tube 22 provides a chute through which a user may load food items to be processed into the work bowl 14.

Figure 2:
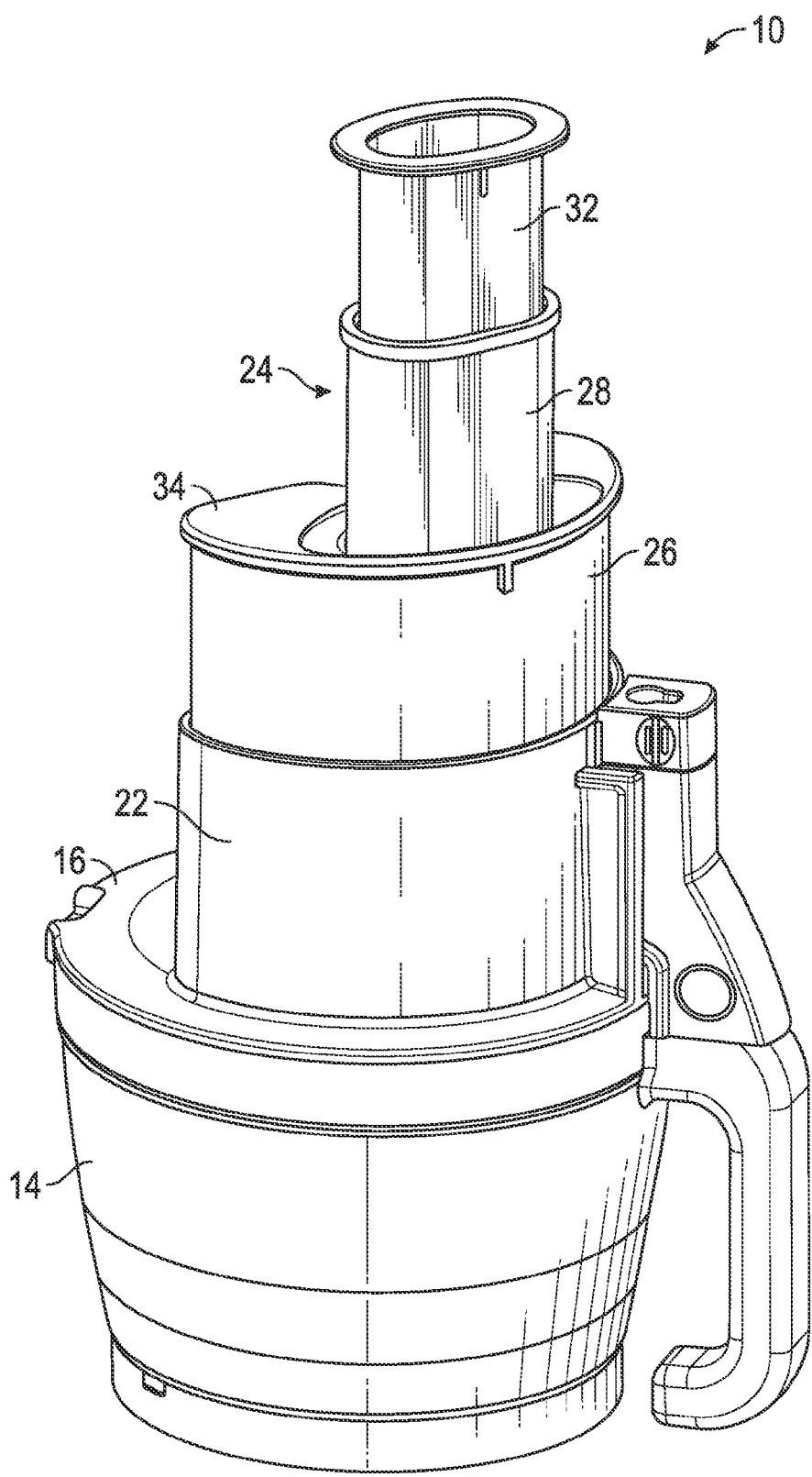
FIG. 2 is a perspective view of a food processor receptacle and lid having a feed tube assembly according to an embodiment of the present invention.

Referring to FIG. 2, the lid 16 defines a substantially circular body sized and dimensioned to cover work bowl 14. The lid 16 also includes an internal frame defining the feed tube opening (not shown). The feed tube opening may be generally oval in shape, although other shapes and dimensions are envisioned without departing from the broader aspects of the present invention. As further shown therein, a feed tube assembly 24 is selectively positionable within the feed tube 22, as discussed in detail hereinafter.

Figure 3:
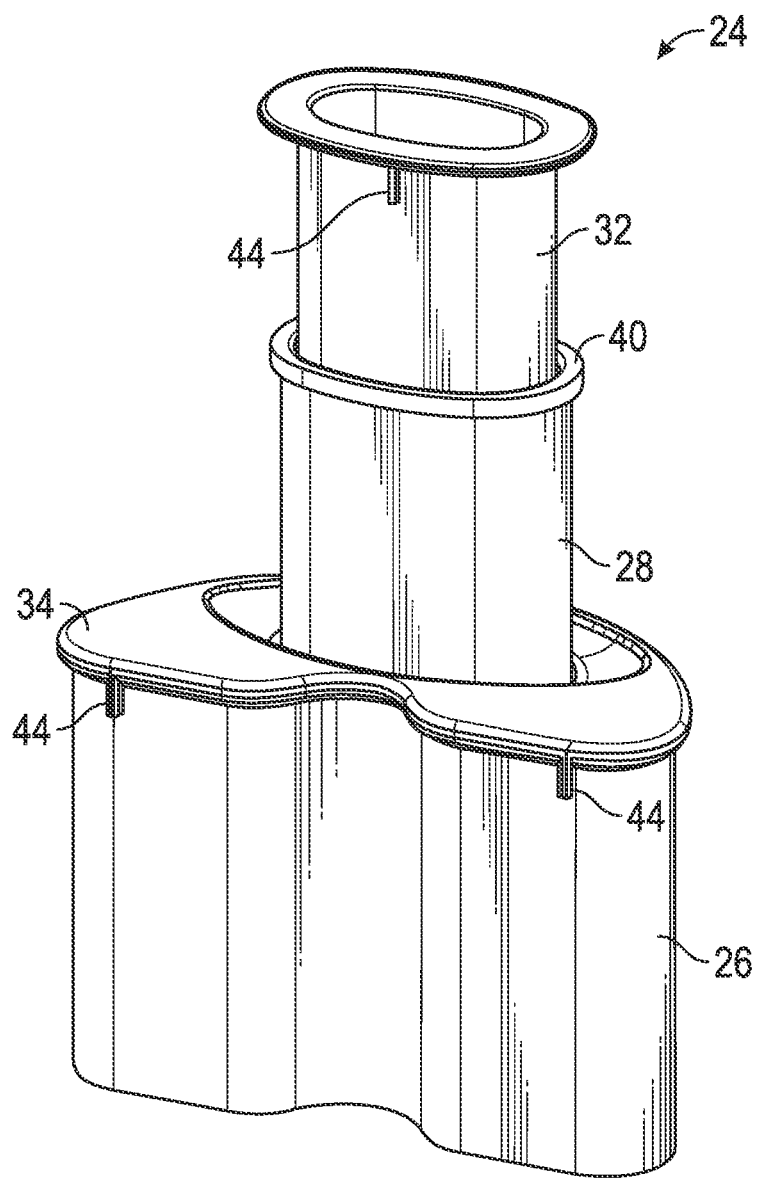
FIG. 3 is a perspective view of a food processor feed tube assembly according to an embodiment of the present invention.
Figure 4:
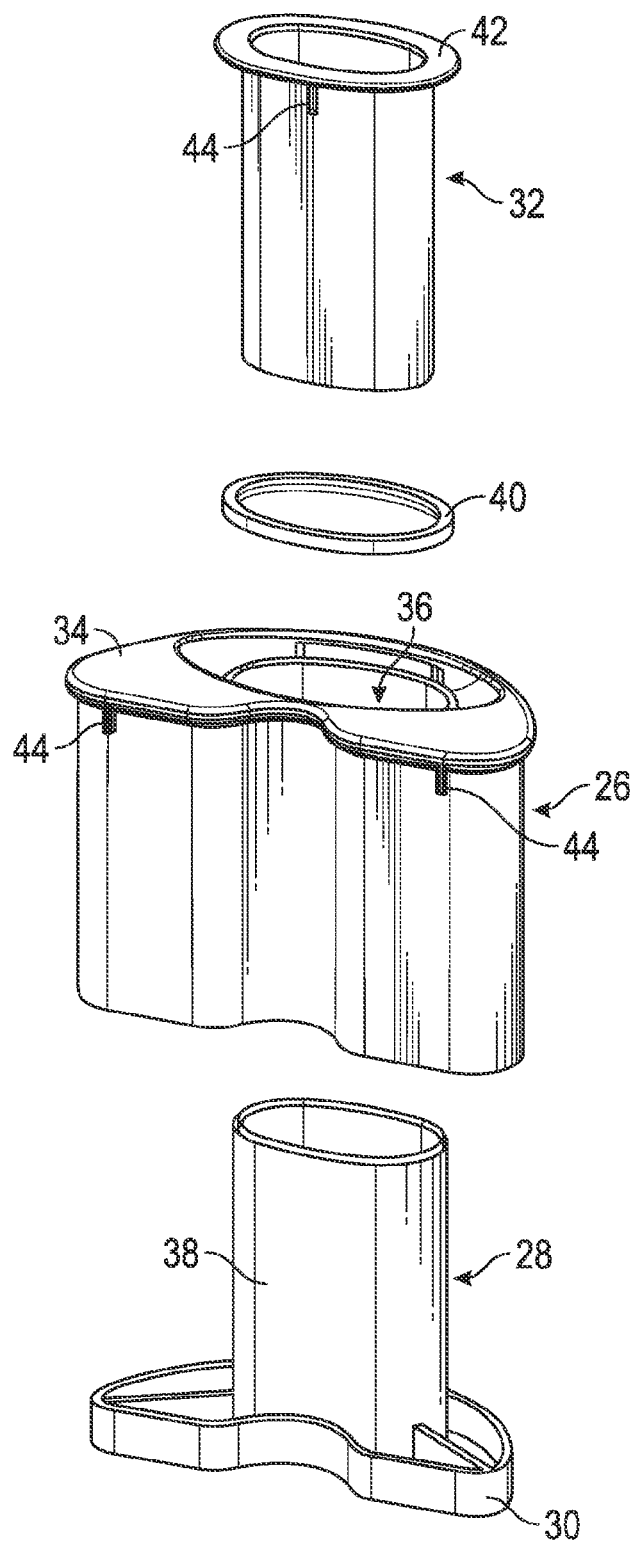
FIG. 4 is an exploded, perspective view of the food processor feed tube assembly of FIG. 3.
Figure 7:
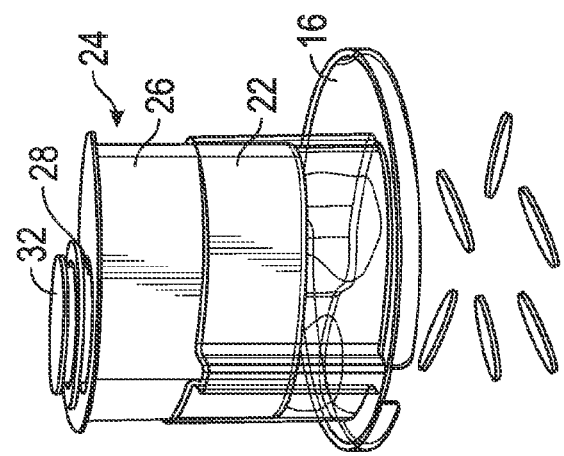
FIG. 7, is a perspective view of the telescoping feed tube assembly of FIG. 2, illustrating a collapsed position.
Figure 6:
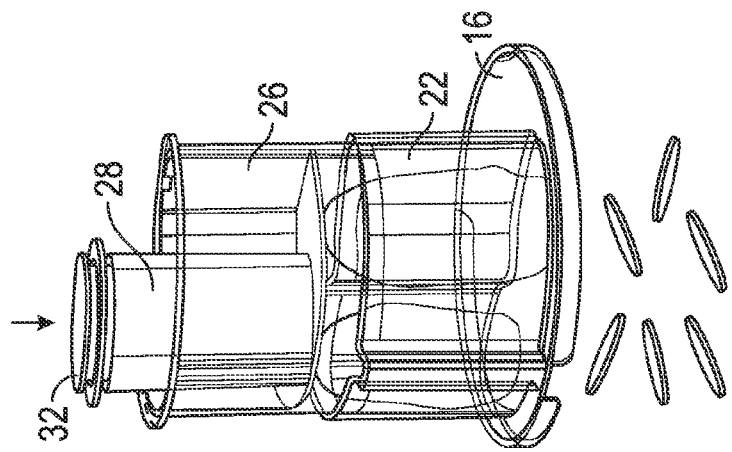
FIG. 6 is a perspective view of the telescoping feed tube assembly of FIG. 2, illustrating a partially extended position.
Figure 5:
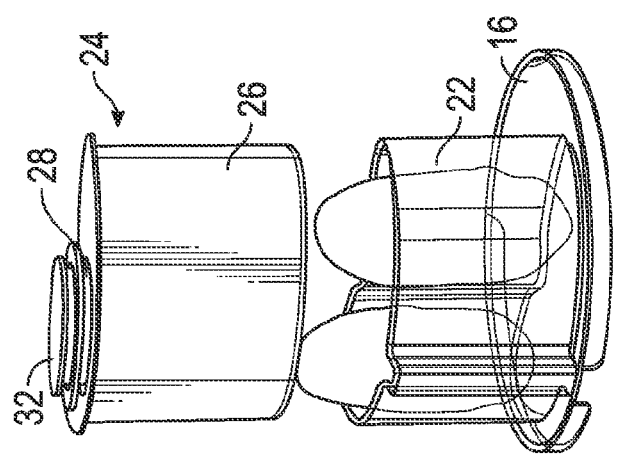
FIG. 5 is a perspective view of a telescoping feed tube assembly of the food processor of FIG. 2, illustrating a collapsed position.
Figure 8:
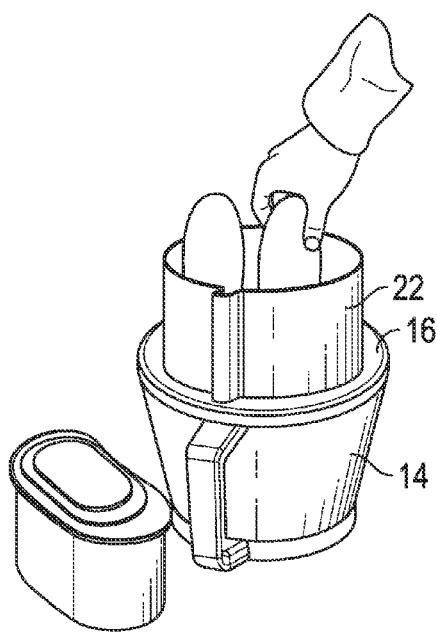
FIG. 8 is a perspective view of a food processor and telescoping feed tube assembly, illustrating a loading position.
Figure 9:
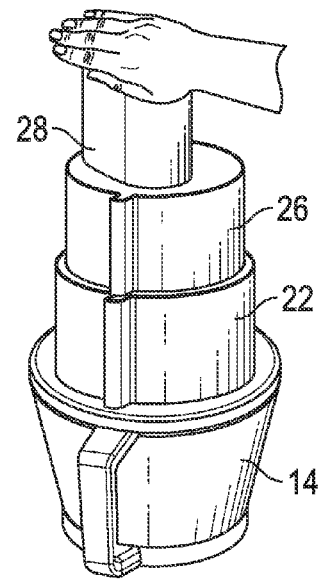
FIG. 9 is a perspective view of the food processor and telescoping feed tube assembly of FIG. 8, illustrating the feed tube assembly in a fully extended position.
Figure 10:
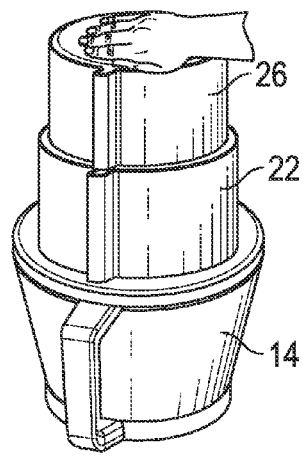
FIG. 10 is a perspective view of the food processor and telescoping feed tube assembly of FIG. 8, illustrating the feed tube assembly in a partially collapsed position.
Figure 11:
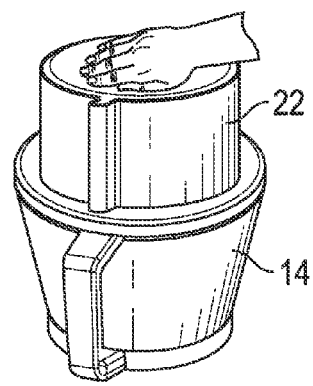
FIG. 11 is a perspective view of the food processor and telescoping feed tube assembly of FIG. 8, illustrating the feed tube assembly in a fully collapsed position.

Turning now to FIGS. 3 and 4, the feed tube assembly 24 includes a first feed tube extension 26, a second feed tube extension 28 having a main pusher 30, and a secondary pusher 32 that are telescopically received by one another, as discussed in detail hereinafter. The first feed tube extension 26 defines a substantially annular body having a substantially oval cross-section and is dimensioned to be slidably received in feed tube 22, as best shown in FIG. 2. The first feed tube extension 26 also includes a cover 34 having a top opening 36 that is substantially oval in shape.

The second feed tube extension 28 includes a stack 38 defining a substantially annular body having a substantially oval cross-section and is dimensioned to be slidably received in the opening 36 in the first feed tube extension 26. As best shown in FIG. 4, a main pusher 30 is integrally formed with the stack 38. The main pusher 30 has a substantially flat bottom surface and an outer periphery that is dimensioned to be closely and slidably received by the internal walls of the first feed tube extension 26. A retaining ring 40 is configured to fit around the outer periphery of the stack 38 of the second feed tube extension 28 to prevent the second feed tube extension from decoupling from the first feed tube extension 26.

The feed tube assembly 24 also includes a secondary pusher 32 defining a substantially annular body having a substantially oval cross section and a top flange 42. As shown in FIG. 3, the secondary pusher 32 is dimensioned to be slidably received in the stack 38 of the second feed tube extension 28.

The first feed tube extension 26 and secondary pusher 32 may also include one or more position stops 44 for limiting downwards travel of the first feed tube extension 26 and pusher 32 within the feed tube 22 and stack 38, respectively, with which they are nested.

Importantly, the first feed tube extension 26, second feed tube extension 28 and secondary pusher 32 are in nested arrangement such that the feed tube assembly 24 is movable between an extended position, as shown in FIGS. 2 and 3, and a retracted position, in which the pusher 32, second feed tube extension 28 and first feed tube extension 26 are received within, and do not extend substantially above, feed tube 22.

In operation, for smaller food items, a user may collapse the feed tube assembly 24 such that the first feed tube extension 26 and second feed tube extension 28 are substantially nested within the main feed tube 22. A user may then insert the food items into the opening in the second feed tube extension 28 and utilize secondary pusher 32 to urge the food items through the feed tube 22 and into the bowl 12.

For taller food items, such as carrots, celery and the like, the feed tube assembly 24 may first be placed in the fully extended position, as shown in FIGS. 1 and 2. In this position, a user may then insert the tall food items into the opening in the second feed tube extension 28 and utilize the pusher 32 to urge the food items downward. As the food items are fed into the bowl 12 by exerting downwards pressure on the pusher 32, the second feed tube extension 28 is pushed downward until it is in nested position substantially within the first feed tube extension and, subsequently, the first feed tube extension 26 is collapsed until it is in nested position substantially within the feed tube 22. As will be readily appreciated, the ability of the first and second feed tube extensions 26, 28 to collapse from their extended position allows constant downward pressure on the food item. As the final inches of the food items are urged into the bowl, the feed tube assembly 24 assumes its fully collapsed and nested position. In this manner, the feed tube assembly 24 of the present invention is capable of easily and quickly accommodating tall food items to be processed.

In addition to the above, with reference to FIGS. 5-7 and FIGS. 8-11, the feed tube assembly 24 of the present invention also facilitates the processing of large food items, such as whole potatoes and the like. In particular, when processing large food items, a user may insert the large food items directly into the wide-mouth main feed tube 22, and utilize the pusher 30 of the second feed tube extension 28 (while the feed tube assembly 24 is in nested/collapsed position) to urge the food item through the feed tube 22 and into the bowl 12 for processing, thus obviating the need to first cut the food item into small pieces which has heretofore been necessary.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processor, comprising:
   a base;
   a motor disposed within said base;
   an output shaft operatively connected to said motor and extending outwardly from said base, said output shaft being rotatable upon actuation of said motor;
   a work bowl received on said base;
   a lid removably received on said work bowl, said lid including a feed tube extending upwardly from said lid and defining a passageway configured to receive a food product therethrough for guiding said food product into said work bowl; and
   a feed tube assembly including:
      a first feed tube extension including an annular body dimensioned to be slidably received by said feed tube of said lid, a cover atop said body, and an aperture formed in said cover;
      a main pusher having a substantially planar bottom surface defining a first pusher area, said main pusher being slidably receivable by said feed tube of said lid; and
      a secondary pusher having a substantially planar bottom surface defining a second pusher area, said secondary pusher being slidably receivable by said main pusher;
      wherein said first feed tube extension is movable between a nested position in which said first feed tube extension is substantially nested within said feed tube of said lid and an extended position in which said first feed tube extension extends substantially above said feed tube of said lid;
      wherein said first pusher area is substantially greater than said second pusher area;
      wherein said main pusher includes an aperture therethrough and a stack extending upwardly therefrom and surrounding said aperture, said stack being slidably receivable by said aperture in said cover of said first feed tube extension; and
      wherein said main pusher is movable between a nested position in which said stack is substantially entirely housed within said first feed tube extension and an extended position in which said stack extends substantially above said cover of said first feed tube extension.

2. The food processor of claim 1, wherein:
said secondary pusher is slidably receivable within said stack; and
said second pusher area substantially corresponds to a cross-sectional area of said stack.

3. The food processor of claim 1, wherein:
a retaining ring is positioned about said stack at a distal end thereof, said retaining ring being configured to prevent decoupling of said main pusher from said first feed tube extension.

4. The food processor of claim 2, wherein:
said secondary pusher includes an annular flange at a top, distal end thereof, said annular flange being configured to limit an insertion depth of said secondary pusher within said stack of said main pusher.

5. The food processor of claim 4, wherein:
said feed tube assembly is selectively movable between a retracted position in which said first feed tube extension, said main pusher including said stack and said secondary pusher are substantially nested and disposed substantially entirely within said feed tube of said lid, and an extended position in which said first feed tube extension is extended from said feed tube of said lid and said stack of said main pusher is extended from said first feed tube extension.

6. The food processor of claim 1 wherein:
said feed tube of said lid includes a guide groove in an inner surface thereof; and
said first feed tube extension includes a tongue formed in an outer surface of said annular body which is configured to be received by said guide groove.

* * * * *